(12) United States Patent
Scheidling et al.

(10) Patent No.: US 6,370,982 B1
(45) Date of Patent: Apr. 16, 2002

(54) DEVICE FOR FASTENING CABLE PULL ELEMENTS

(75) Inventors: Mathias Scheidling, Frieberg; Arnd Bürger, Einbeck, both of (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 0 days.

(21) Appl. No.: 09/645,745

(22) Filed: Aug. 24, 2000

(51) Int. Cl.[7] .................................................. F16C 1/10
(52) U.S. Cl. ....................... 74/502.4; 74/502.6; 403/122
(58) Field of Search ............................. 74/502.4, 502.6, 74/473.29; 403/122

(56) References Cited

U.S. PATENT DOCUMENTS

| | | | | |
|---|---|---|---|---|
| 2,438,548 A | * | 3/1948 | Ehmann | 287/76 |
| 4,348,348 A | * | 9/1982 | Bennett | 264/255 |
| 5,163,338 A | * | 11/1992 | Sharp | 74/502.4 |
| 5,265,495 A | * | 11/1993 | Bung | 74/502.6 |
| 5,383,377 A | * | 1/1995 | Boike | 74/502 |
| 5,682,798 A | * | 11/1997 | Malone | 74/502.6 |
| 5,709,132 A | * | 1/1998 | Irish | 74/502.4 |
| 6,308,395 B1 | * | 10/2001 | Webb | 29/453 |

FOREIGN PATENT DOCUMENTS

EP 0 250 063 * 12/1987 ............. F16C/1/14

* cited by examiner

*Primary Examiner*—Sherry Estremsky
*Assistant Examiner*—Eric Williams
(74) *Attorney, Agent, or Firm*—Cohen, Pontani, Lieberman & Pavane

(57) ABSTRACT

A device for fastening cable pull elements of cables, preferably for gear shift systems in motor vehicles. The device including fastening elements and the cable pull core. A fastenin rod with a cable pull core is arranged at a coupling element and a fastening element is enclosed by the coupling element and a rubber element with a gap dimension, so that oscillations are not transmitted.

5 Claims, 1 Drawing Sheet

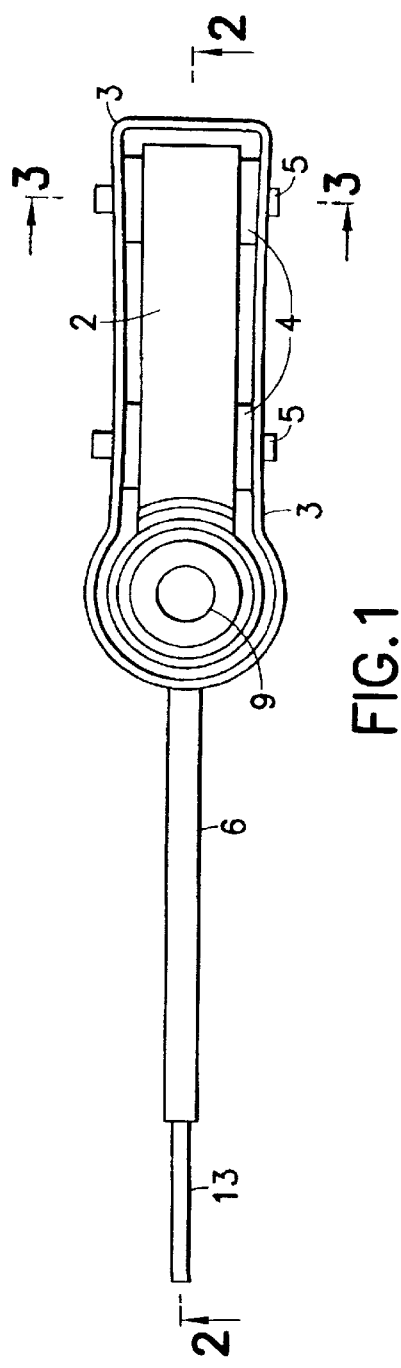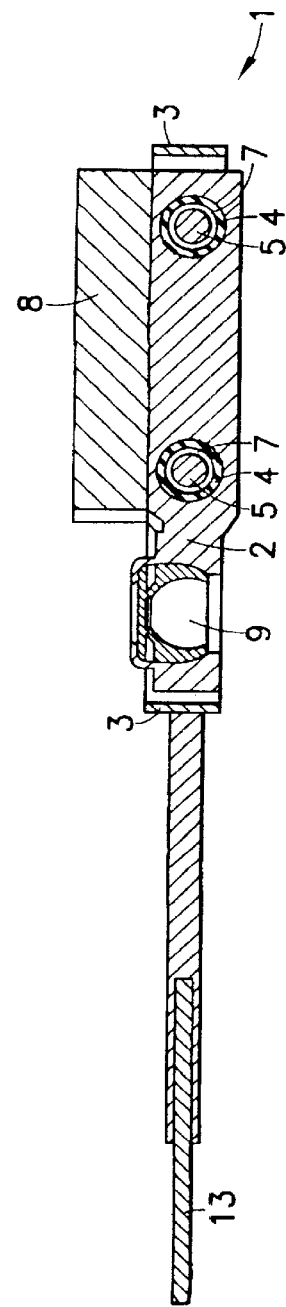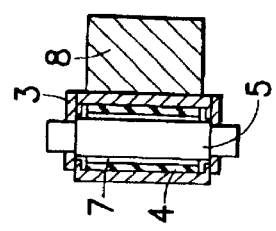

DEVICE FOR FASTENING CABLE PULL ELEMENTS

BACKGROUND OF THE INVENTION

1. Field of the Invention

The invention relates to a device for fastening cable pull elements of cables.

The invention can be used wherever cable pull cores of push-pull cables for gear shift systems in motor vehicles must be connected with corresponding connection pieces of the transmission or gear shift.

2. Discussion of the Prior Art

Connections of this kind between the cable pull core and the connection parts fastened thereto are currently designed so that the connection part is attached or snapped onto a spherical or hemispherical member, a transmission pin or other suitable element, so that a detachable connection is made. As a rule, known connection elements are designed so that there is a rubber connection between the fastening piece and the cable pull core of the cable, so that a movable connection is formed. Because of the rubber, noises and vibrations are transmitted only to a small degree. However, minimization of the exciting frequency or amplitude and optimization of the resonant frequency of the system are possible only to a very limited degree in this way. Insofar as it is the object of the connection parts, minimization can be achieved by using a very soft rubber which results in extensive wear. If extensive wear is to be avoided, only a high-strength rubber can be used, which in turn results in extensive transmission of oscillations and noise. This applies analogously for other materials that can be used for damping, for example, plastic parts.

U.S. Pat. No. 5,265,495 discloses a device for fastening cable pull elements of cables which has a coupling element and a fastening element, wherein the fastening element is enclosed by the coupling element partially with a gap dimension and two rubber elements. The device has the disadvantage that vibrations and noise are transmitted.

SUMMARY OF THE INVENTION

Therefore, it is the object of the present invention to overcome the disadvantages of the prior art and to provide a device for fastening cable pull elements of cables by which a decoupling of transmissions of vibrations and noise from the fastening device to the cable pull element is effected to a great extent.

Pursuant to this object, and others which will become apparent hereafter, one aspect of the present invention resides in a device for fastening cable pull elements of cables, which has a fastening rod with a cable pull core arranged at a coupling element. A fastening element for the fastening means is enclosed by the coupling element and a rubber element with a gap dimension. The fastening rod and cable pull are fixedly connected with one another. Ideally, the cable pull is integrated in the fastening rod.

The coupling element with which the fastening rod is fixedly connected is decoupled from the fastening element by an air gap, the so-called gap dimension. The gap dimension is to be selected so that the coupling element and the fastening piece are movable against one another with a slight tolerance, so that a loose connection is formed which does not transmit vibrations, noise and oscillations. A rubber element which provides for an additional elastic connection between the coupling element and the fastening piece is arranged between the gap dimension and the fastening piece. Suitable plastic parts are also possible instead of a rubber element.

If the fastening piece is to be fastened to a hemispherical pin, a ball socket is arranged at the fastening piece for receiving the fastening means. It is advantageous for quick fastening when the ball socket has a hole at its highest point.

It is advantageous for the invention to arrange an added mass at the fastening piece for minimizing the exciting frequency and exciting mass. This minimizes occurring oscillations.

In order to realize increased stability, it is advantageous to arrange a plurality of distance pieces in the coupling element. The distance pieces can be made of metal, for example. The coupling element is fixedly connected with the distance pieces.

The distance pieces are surrounded by the gap dimension. The gap dimension is adjusted between the distance piece and the fastening piece via the diameter ratio. The coupling piece can be made of plastic, metal or another suitable material.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 shows a top view of the device according to the invention with the c gravity opposite to the cable pull and the ball socket;

FIG. 2 shows a section A—A from FIG. 1; and

FIG. 3 shows a section B—B from FIG. 1.

DETAILED DESCRIPTION OF THE PREFERRED EMBODIMENTS

FIG. 1 shows the device 1 according to the invention for fastening cable pull elements of cables for a gear shift system in motor vehicles in which the center of gravity is arranged opposite to the cable pull core 13. A ball socket 9 which has an opening in its upper part, as is shown in section A—A, is snapped into the fastening means. A fastening rod 6 which provides for a connection between the cable pull core 13 and the coupling element 3 is arranged between the cable pull core 13 and the coupling element 3. The two distance pieces 5 are fixedly connected with the coupling element 3 and project at both sides into the coupling element 3 which is made of metal and encloses the fastening element 2. The gap dimension 7 which ensures the decoupling of the two parts 2, 3 from one another is located between the distance pieces 5 and the fastening element 2, wherein the rubber element 4 carries out the damping. As is shown in FIGS. 2 and 3, an added mass 8 is arranged on the fastening element 2, which minimizes the respective exciting frequency and exciting amplitude.

The solution according to the invention has the advantage that vibrations and noise are not transmitted from the fastening piece 2 to the coupling element 3 and, accordingly, to the cable pull core 13. Due to the distance of the gap dimension 7 adapted to the utilized rubber element 4, the device can be adjusted exactly so that no oscillations are transmitted on the one hand and high strength and low wear are exhibited on the other hand.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A device for fastening cable pull elements of cables, comprising a cable pull core;

a fastening rod connected to an end of the cable pull core;

a fastening element having an opening therethrough;

a ball socket in the fastening element;

a coupling element that at least partially surrounds the fastening element, the fastening rod being connected to the coupling element;

a distance piece that projects through the opening in the fastening element, the distance piece having two ends connected to the coupling element;

a rubber element arranged in the opening of the fastening element so that there is a gap dimension between the rubber element and the distance piece, whereby the rubber element and the gap dimension are located between the fastening element and the coupling element; and an additional mass element arranged on the fastening element.

2. A device according to claim 1, wherein the ball socket is arranged between the opening and the cable pull core.

3. A device according to claim 1, wherein at least two distance pieces are provided.

4. A device according to claim 1, wherein the added mass is arranged over the distance piece.

5. A device according to claim 1, wherein the ball socket has an open top.

\* \* \* \* \*